United States Patent [19]
Gelardi et al.

[11] Patent Number: 5,417,379
[45] Date of Patent: * May 23, 1995

[54] INTEGRALLY MOLDED RECYCLABLE VIDEO TAPE CASSETTE

[75] Inventors: Paul J. Gelardi; John A. Gelardi; David A. Capotosto, all of Cape Porpoise, Me.

[73] Assignee: LCV Associates, Kennebunkport, Me.

[ * ] Notice: The portion of the term of this patent subsequent to Mar. 3, 2009 has been disclaimed.

[21] Appl. No.: 844,289
[22] Filed: Mar. 2, 1992

Related U.S. Application Data

[62] Division of Ser. No. 522,361, May 11, 1990, Pat. No. 5,092,536.

[51] Int. Cl.⁶ .......................................... G11B 23/087
[52] U.S. Cl. ...................................................... 242/347
[58] Field of Search ............... 242/76, 197, 198, 199, 242/200, 347; 360/132, 130.21; 206/387, 389

[56] References Cited

U.S. PATENT DOCUMENTS

| | | | |
|---|---|---|---|
| Re. 32,447 | 6/1987 | Gelardi et al. | 242/199 |
| D. 245,418 | 8/1977 | Katayama et al. | D14/121 |
| D. 271,392 | 11/1983 | Sumisha et al. | D14/121 |
| D. 274,327 | 6/1984 | Sumisha et al. | D14/121 |
| D. 280,815 | 10/1985 | Gelardi et al. | D14/121 |
| D. 303,796 | 10/1989 | Nishiyama et al. | D14/121 |
| 3,735,939 | 5/1973 | Inaga | 242/198 |
| 3,843,035 | 10/1974 | Fitterer et al. | 242/199 X |
| 3,900,171 | 8/1975 | Serizawa | 242/198 |
| 3,980,255 | 9/1976 | Serizawa | 242/199 X |
| 4,004,752 | 1/1977 | Kamaya | 242/198 |
| 4,106,724 | 8/1978 | Higashida | 242/198 |
| 4,184,594 | 1/1980 | Hehn | 242/199 X |
| 4,203,564 | 5/1980 | Nemoto | 242/71.8 |
| 4,232,840 | 11/1980 | Sugawara | 242/198 |
| 4,290,567 | 9/1981 | Saito | 242/199 X |
| 4,367,963 | 1/1983 | Daughters | 242/199 X |
| 4,453,683 | 6/1984 | Reimer et al. | 242/199 |
| 4,485,988 | 12/1984 | Kukuya et al. | 242/199 |
| 4,519,521 | 5/1985 | Yoshii | 242/198 X |
| 4,591,936 | 5/1986 | Kikuya et al. | 242/198 X |
| 4,620,255 | 10/1986 | Cook et al. | 242/199 X |
| 4,624,423 | 11/1985 | Schoettle et al. | 242/199 |
| 4,662,579 | 5/1987 | Gelardi et al. | 242/199 |
| 4,678,080 | 7/1987 | Nelson | 206/387 |
| 4,706,149 | 11/1987 | Machida et al. | 242/199 X |
| 4,740,856 | 4/1988 | Yoshii et al. | 360/132 |
| 4,770,367 | 9/1988 | Carroll | 242/199 |
| 4,793,570 | 12/1988 | Gelardi et al. | 242/199 |
| 4,802,048 | 1/1989 | Perkins et al. | 242/199 X |
| 4,803,575 | 2/1989 | Nishimura et al. | 360/132 X |
| 4,807,077 | 2/1989 | Zaitsu et al. | 360/132 |
| 4,809,113 | 2/1989 | Nishimura et al. | 360/132 |
| 4,842,217 | 6/1989 | Vinson | 242/199 |
| 4,844,377 | 7/1989 | Shiomi et al. | 242/198 |
| 4,883,176 | 11/1989 | Hart et al. | 242/199 X |
| 4,969,612 | 11/1990 | Thomas | 242/199 |
| 5,092,536 | 3/1992 | Gelardi et al. | 242/199 |

FOREIGN PATENT DOCUMENTS

| | | |
|---|---|---|
| 0125688 | 5/1984 | European Pat. Off. . |
| 0285384 | 10/1988 | European Pat. Off. . |
| 0417969 | 3/1991 | European Pat. Off. . |
| WO88/08196 | 10/1988 | WIPO . |
| WO91/07752 | 5/1991 | WIPO . |

OTHER PUBLICATIONS

Roger F. Jones, "Polypropylene and Propylene Copolymers", Modern Plastics Encyclopedia, pp. 259-264 (U.S.A. 1965).

"Properties of Packaging Films", Chart, Modern Packaging Encyclopedia, pp. 145-146 (U.S.A. 1967).

*Primary Examiner*—Daniel P. Stodola
*Assistant Examiner*—John P. Darling
*Attorney, Agent, or Firm*—James Creighton Wray

[57] ABSTRACT

An integrally molded polypropylene tape cassette has a base with vertical first and second side walls. A rear wall is attached to the base by an integral hinge. A cover attached to the rear wall by an integral hinge, and a dust door attached to the cover by an integral hinge. Snaps between the cover and base connect and close the apparatus with integral springs pressing on tape reel hubs. The dust door covers a forward wall protruding from the base between the first and second side walls. The forward wall has slots and posts for allowing passing of the tape between the interior and exterior of the cassette. The cassette further includes a dust door latch which is integrally molded with one of the sides of the tape. An integrally molded tape hub brake is positioned between the hubs for locking the hub flanges when the cassette is not in use the entire cassette is made of polypropylene material.

10 Claims, 12 Drawing Sheets

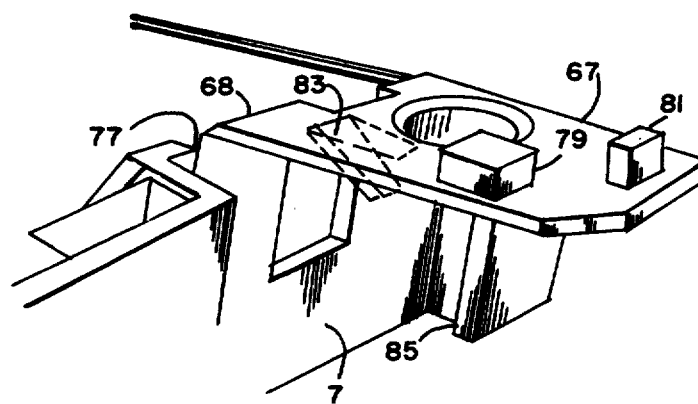
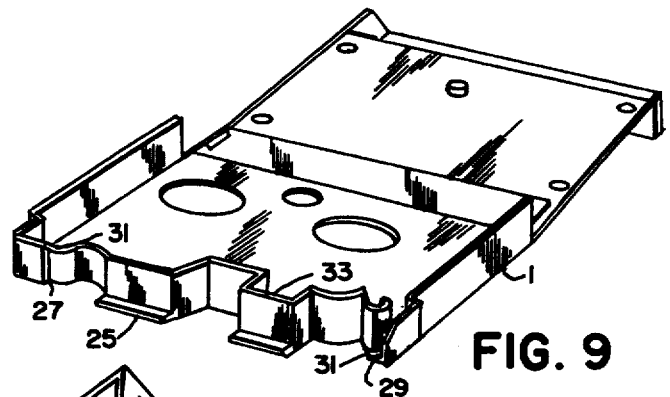
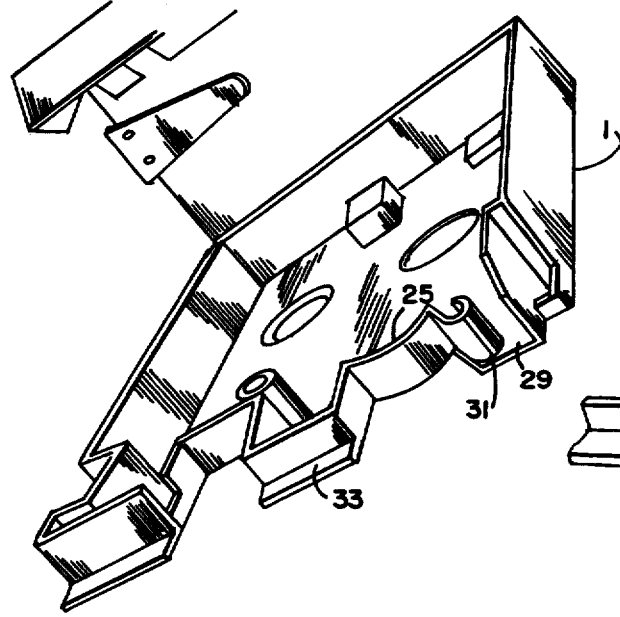
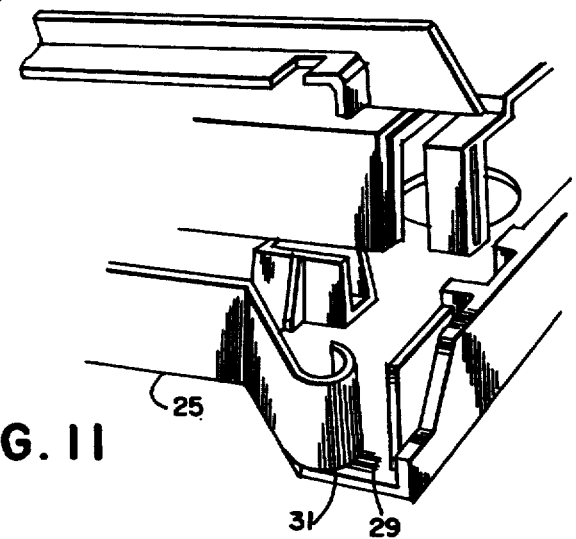

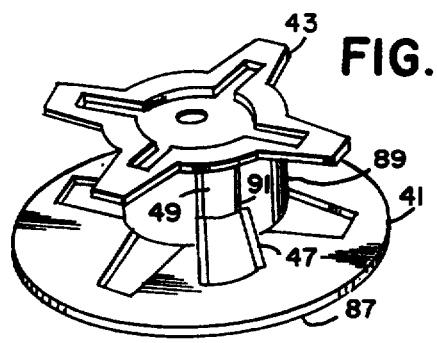
FIG. 12
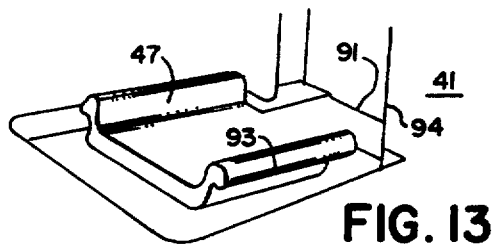
FIG. 13
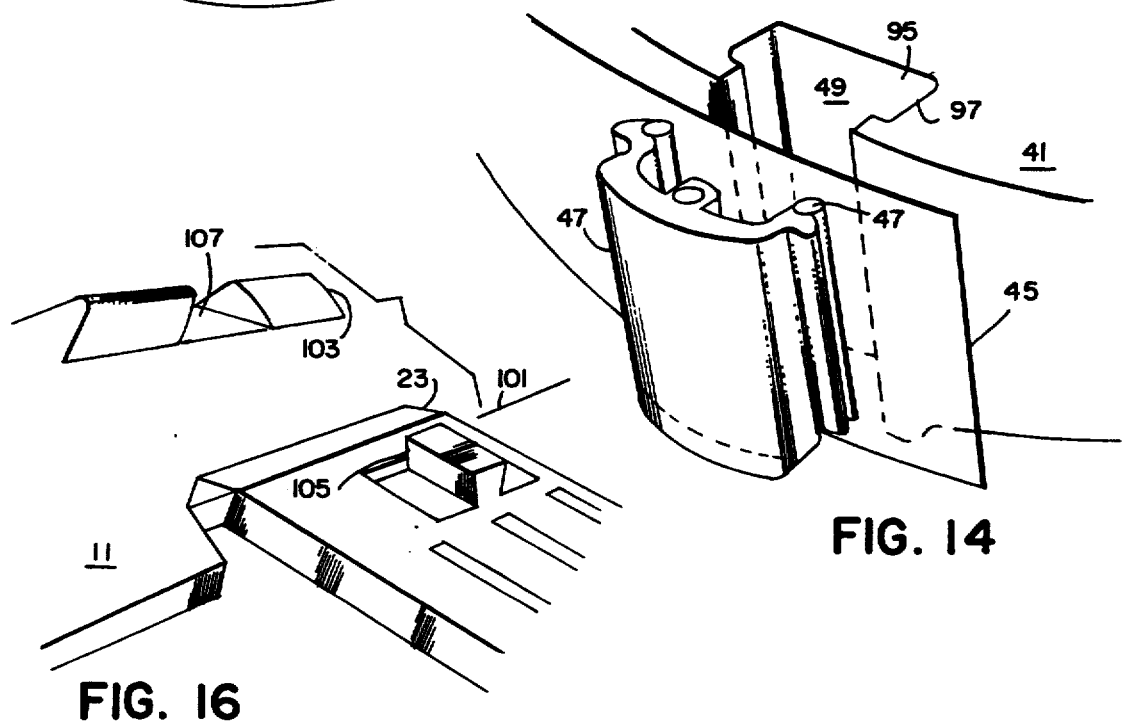
FIG. 14
FIG. 16
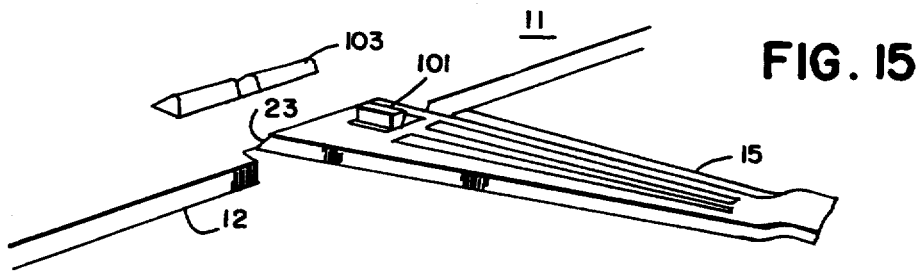
FIG. 15

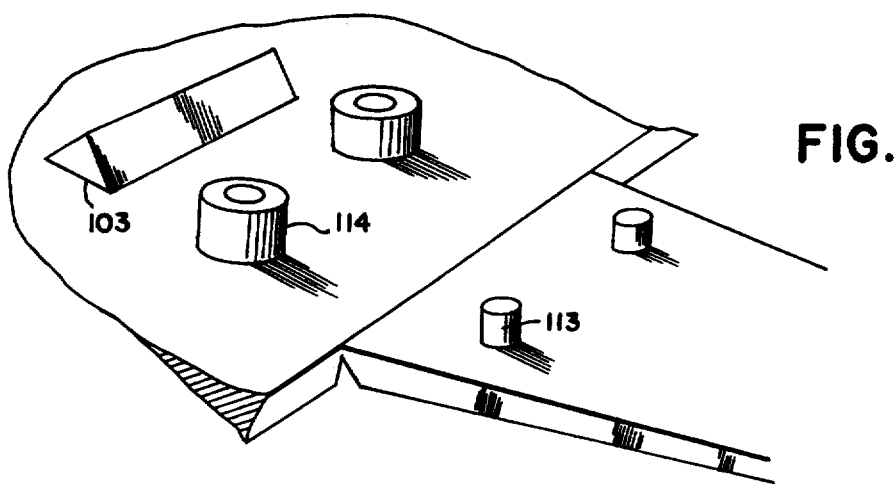
FIG. 24
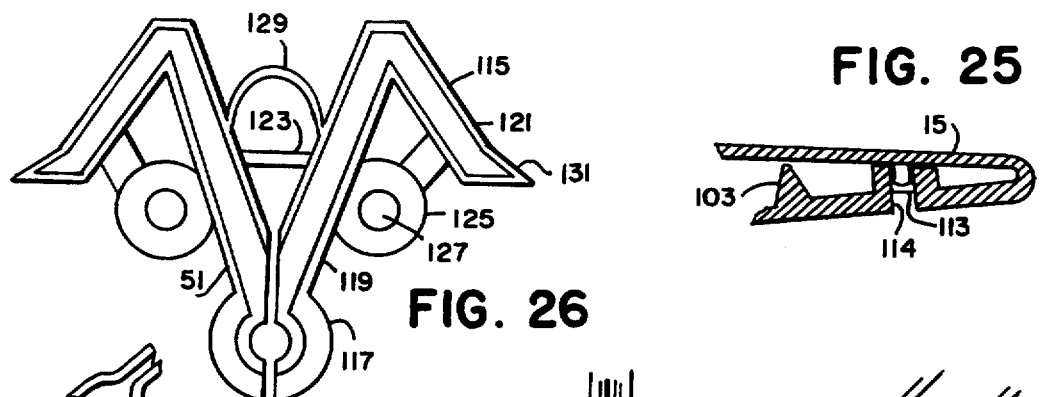
FIG. 25
FIG. 26
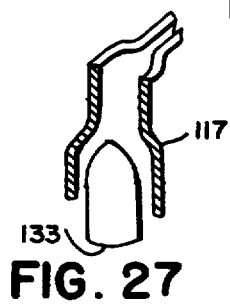
FIG. 27
FIG. 28
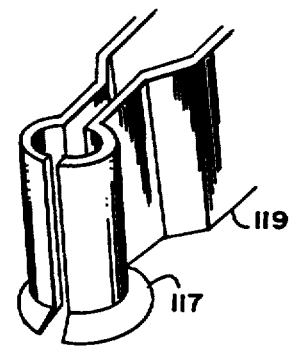
FIG. 30
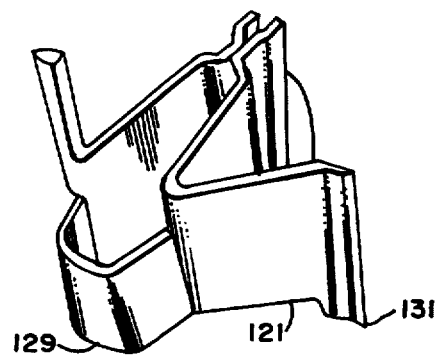
FIG. 29
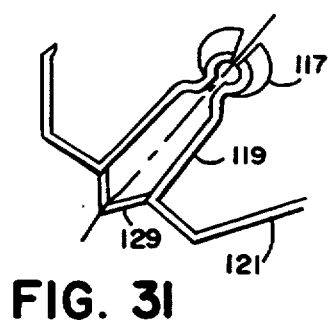
FIG. 31

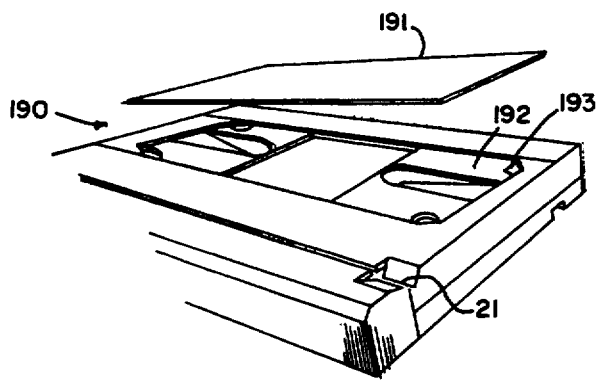
FIG. 48
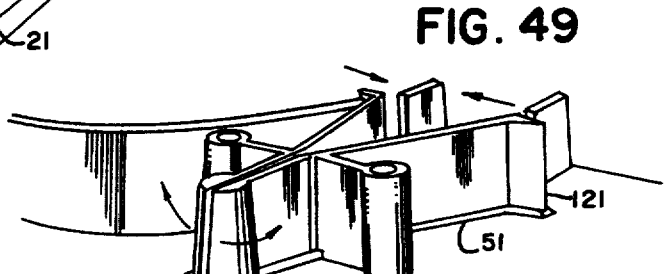
FIG. 49
FIG. 50
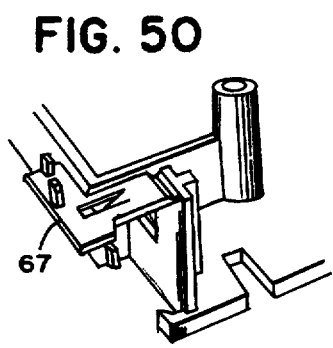
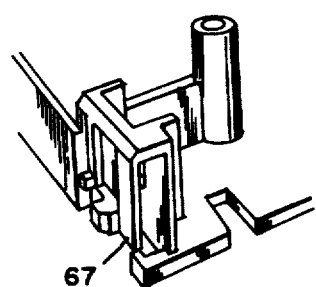
FIG. 51
FIG. 52
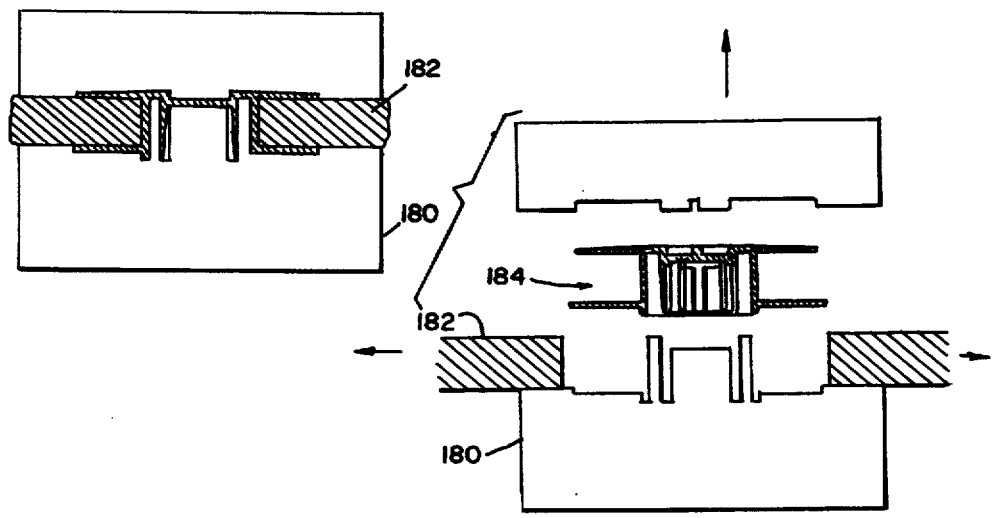
FIG. 53

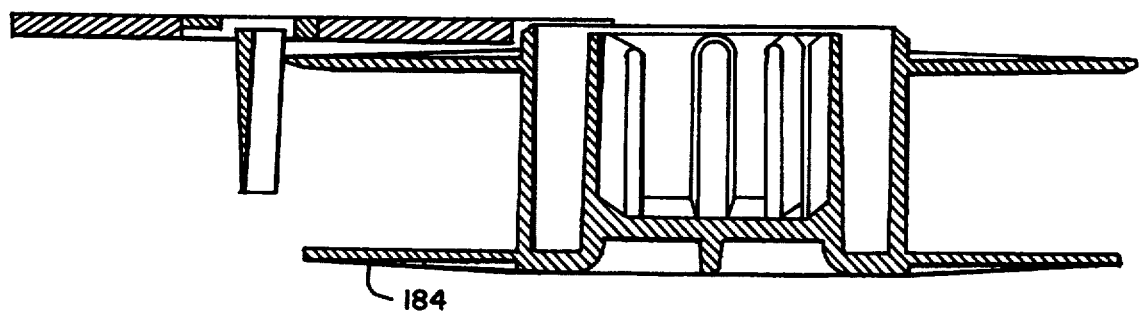
FIG. 54
FIG. 56
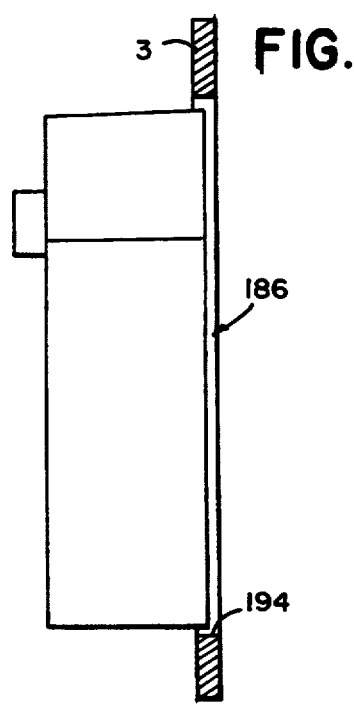
FIG. 57
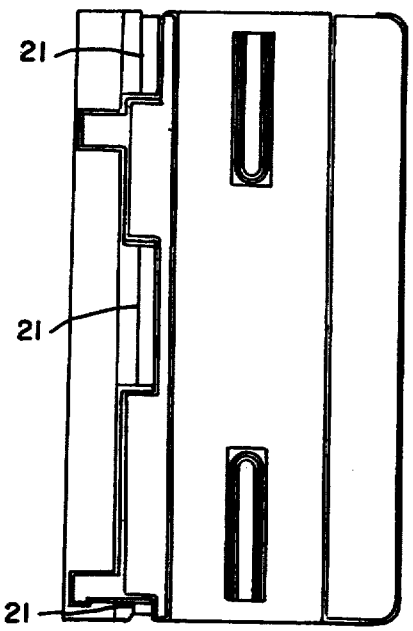
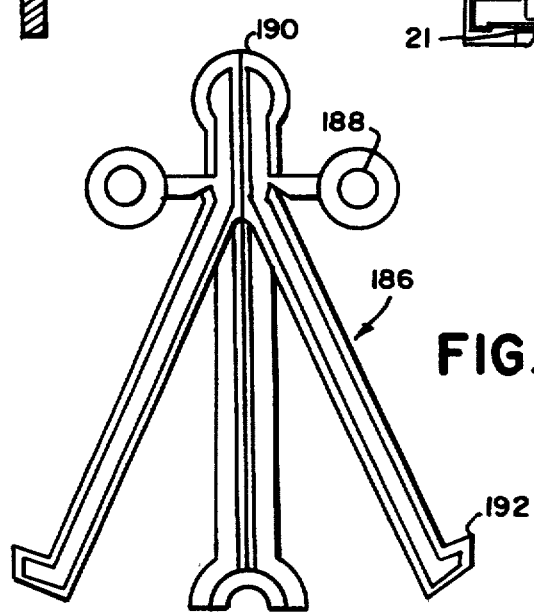
FIG. 55

INTEGRALLY MOLDED RECYCLABLE VIDEO TAPE CASSETTE

This application is a division of application Ser. No. 522,361, filed May 11, 1990, now U.S. Pat. No. 5,092,536.

BACKGROUND OF THE INVENTION

This invention relates to recyclable low cost video cassettes.

The numbers of households and businesses with standard format video tape cassette players is very large and is expected to increase shortly to substantially full saturation in 80% or more of households and businesses. Many households and businesses have more than one video tape cassette player. Each of the cassette players is a potential user of many cassettes. Many of the cassettes will be used only once or only a few times. The infrequently used cassettes are usually constructed in the same manner as frequently used cassettes.

The cassette players offer a resource for short term information and advertising. For advertising tapes having only small numbers of plays, cassette housings reels and brakes are available only in full-cost conventional designs, which add to the cost of what otherwise might be low cost advertising media. For example, the cost of the cassettes may far outweigh the cost of producing, planning and delivering advertising tapes to prospective customers for goods and services. It is expected that such advertising cassettes may be used once or twice and then destroyed.

Currently available standard video cassettes are made of up to 37 parts. The parts which make up the cassette are of different construction and different types of materials. That makes it difficult to salvage and recycle the materials when the cassettes are thrown away.

Standard video cassette made with 37 parts have equal numbers of assembly steps and assembly stations. The number of assembly steps and stations is directly related to the cost of manufacturing the video cassettes.

The cost of producing the individual parts and of assembling the separate parts increases the cost of the cassettes.

A need exists for a cassette housing which is made out of material which may be readily recycled without disassembling the cassette. Similarly, a need exists for a low cost video cassette to take advantage of the market that exists for low price prerecorded cassettes and free distribution cassettes used to advertise products and services.

SUMMARY OF THE INVENTION

The present invention provides the low cost video cassette housing of uniformly manufactured compatible materials which will easily be recyclable and in which the principal components are made in a single mold and are assembled by rapid uniform motions. The housing and the hub locks are made in a single cavity, and the housing and reels are made of similar material. Supplementary metal options can be included in order to enhance the performance of the low cost video cassette. These options include supports and springs which are designed to be easily removable for recycling of both the housing and the metal parts. When a device has been used, the entire device may be easily recycled with other plastic materials. The plastic cassette may then be crushed, ground and reformed into other useful devices. The magnetic recording tape preferably is pulled from the reels before disposal.

Assembly steps are limited to removing the entire cassette from a mold, dropping reels into place, with leaders extending from the cassette housing, and then folding the back upward, and folding the cover downward until the cover snaps in place. The cassette is ready for use by attaching a prerecorded magnetic tape to the leaders. This, of course, is in the present invention's most basic variation. Some other optional added parts would variate the steps for assembly.

Alternately, the magnetic tape may be pre-attached to leaders and the reels, before the reels and tape are dropped into place in the housing. The cover is then folded inward, and the rear wall and cover are snapped into place in a single continuous motion to ready the cassette for usage. The preferred cassette housing is made in one continuous piece with living hinges between the pieces, which include the base, side walls, front wall, rear wall cover, dust door sides, hub lock, pressure flap and dust door latch. Each reel hub combination can be made in one or two pieces which snap or weld together. An alternate hub lock is made in a single piece, which folds together and attaches to a preformed configuration in the housing base. All of the materials are made of single or compatible plastic materials.

A preferred video tape cassette housing incorporates a base, a rear wall, and first and second opposite side walls connected to the base. A cover is connected to the rear wall, and a dust door is connected to the cover. The side edges of the rear wall engage the rear edges of the side wall, and the side edges of the cover contact the upper edges of the side walls. The dust door is hinged on the cover for permitting movement of the cover between a raised position and a lowered position to thereby expose or cover a magnetic tape protruding from the front of the cassette housing.

The hinges between the sections of the cassette are living hinges which are integrally formed between these sections. The living hinges allow a more efficient molding process and sufficiently decrease the number of parts used in the prior art.

In one form, the cover is made with large, spaced openings and with hub springs which extend inward from the openings. The hub springs are molded to extend inward and downward into the casing when the cover is assembled on the base.

In another form, the housing further includes first and second leaf springs hinged near side edges of the cover. In one form, the springs fold inward and rest atop hubs within the cassette housing. The springs are also connected to the cover with integral living hinges, wherein the hinges provide a certain amount of resiliency for the springs. Ramps are positioned in the cover at spaced distances from the hinge connections with the springs. The ramps are aligned with the hinge connections for underlying portions of the springs and for biasing distal ends of the springs towards engagement with the hubs. Snaps are positioned on the cover between the springs and the ramps or, alternately, are integral with the ramps. The snaps are complementary to portions of the springs for holding the springs on the ramps against the force of the resilient living hinges. The distal end portions of the springs apply spring pressure to the hubs. In one form, the snaps are first and second snaps positioned on opposite sides of the springs for engaging the sides of the springs as they are folded inward within the cover. Alternately, the snaps are blocks aligned with the springs on the cover, and complementary openings in the springs receive and engage the blocks.

In one form, the dust door sides are preformed in angular relation to the top and front of the door.

In another embodiment, the dust door has first and second sides that each have edges hinged to edges of the dust door. The sides incorporate retaining means for connecting the dust door sides to the remainder of the dust door to thereby close the ends of the dust door. Further, the sides of the dust door incorporate a retaining means for attaching and latching the door in the closed position when not in use. These dust door side retaining means are mated with retaining means on the base sides.

In one embodiment, a dust door lock is hinged to a side wall of the base. The lock is foldable downward along the side wall for holding the dust door in closed position.

The rear wall and at least one of the base and side walls incorporate a clasping or engaging means for holding the rear wall upward against the rear edges of the side wall. Further complementary snaps on the cover and at least one of the rear wall or side walls engage to hold the cover downward, with side edges of the cover contacting upper edges of the side walls. The housing in the position with the cover closed is substantially a box having a cover and a base in parallel planes, rear and side walls lying vertically around the edges therebetween, and a living hinged door movably affixed to the front edge of the cover.

A front vertical wall generally extends upward from the base between the forward portions of the first and second side walls. Preferably, an internal forward wall is also positioned somewhat parallel to the front vertical wall and closer to the interior of the molded cassette. The front wall has first and second tape gaps, through which a tape passes out from and into the cassette housing. First and second tape guides project forward from the wall, and tape guide pins vertically extend from positions near the tape gaps for angularly redirecting the tape across the tape guide projections. Preferably all of these elements are molded in a single mold to limit the number of parts needed for the cassette.

A preferred cover includes first and second spaced D-shaped openings, across which windows or labels extend to seal to the cover. These windows or labels can consist of paper or paper board, plastic or plastic film, a combination thereof as in a spaghetti box window, or paper/paper board inserted under the plastic film label trap. These may be adhered to the cassette by any suitable means.

The film windows are single sheets bonded to the outside of the cover and sealed along three edges to leave an open edge for the insertion of an identification graphics card.

A preferred housing incorporates cylindrical walls molded within the base spaced around hub openings for receiving and holding hubs for guiding the winding magnetic tape. Tape reeling hubs nest within the hub receiving walls, which extend to the tape gaps for allowing the tape to pass from the reel on the interior of the housing to the exterior of the front wall for reading.

The tape hubs incorporate a means for quickly attaching and holding the end of a magnetic tape leader. The hubs drop into the walled hub receivers to thereby simplify inserting the tape reels in the housing. The hubs can incorporate means for mating with hub lock brakes to effectively lock the hubs into place when the cassette is not in use. The preferred hub is approximately 2.5 inches in diameter and is a one-piece hub design, which is molded by the use of side actions, which form the internal flange and hub outer surfaces. A conventionally sized hub requires the side actions to travel a distance greater than the hub diameter to allow ejection from the mold. This makes a conventional sized hub economically impractical, since it requires a much larger mold and injection molding machine. The 2.5 inch mini-hub reduces the side action travel and allows tighter linear cavity placement, making a one-piece hub viable.

A hub lock brakes the hubs when not in use. The lock is an integrally molded apparatus incorporating two brake release arms which engage the hubs when not in use. A brake release pin separates the arms and allows rotational movement of the hubs.

These and other and further objects and features of the invention are apparent in the disclosure which includes the above and ongoing specification and claims and drawings.

BRIEF DESCRIPTION OF THE DRAWINGS

FIG. 8 is a detail of an integral dust cover latch.

FIG. 9 is a perspective detail of the one piece molded cassette.

FIG. 10 is an elevational view of one cassette, showing a vertical wall with tape gaps.

FIG. 11 is a detail of the gaps and molded tape guide pins.

FIG. 12 is a detail of an alternative one-piece tape hub with the tape receiving means.

FIG. 13 shows the tape hub receiving slot and hinged tape holding clip.

FIG. 14 shows an alternate view of the tape holding clip and receiving slot combination.

FIG. 15 shows one integrally molded hub spring with integral snap and ramp.

FIG. 16 is a detail of the snap and ramp as shown in FIG. 15.

FIG. 24 shows a detail of a molded hub spring with ramp and alternate snap.

FIG. 25 shows a sectional detail of the FIG. 24 spring folded and snapped.

FIG. 26 shows a top view of one embodiment of the hub lock.

FIG. 27 shows a cutaway detail of a hub lock release post actuating the hub lock release sleeve.

FIG. 28 is a top detail of the hub lock release sleeve.

FIG. 29 is a perspective view of a hub lock similar to one shown in FIG. 26.

FIG. 30 is a detail of the hub lock release sleeve.

FIG. 31 is a plan view of an alternate molded hub lock structure.

FIG. 48 is an elevated view of one embodiment of the labelled cover.

FIG. 49 is an elevated view of the action of one embodiment of the hub locks.

FIGS. 50 is an elevation of a dust door latch.

FIG. 51 is an elevation of an alternative dust door lock using a flexible latch mechanism.

FIGS. 52 and 53 show preferred molds.

FIG. 54 shows a preferred hub.

FIGS. 55 and 56 are top and side views of a preferred brake.

FIG. 57 shows preferred dust door hinges.

DETAILED DESCRIPTION OF THE DRAWINGS

Figure 1:
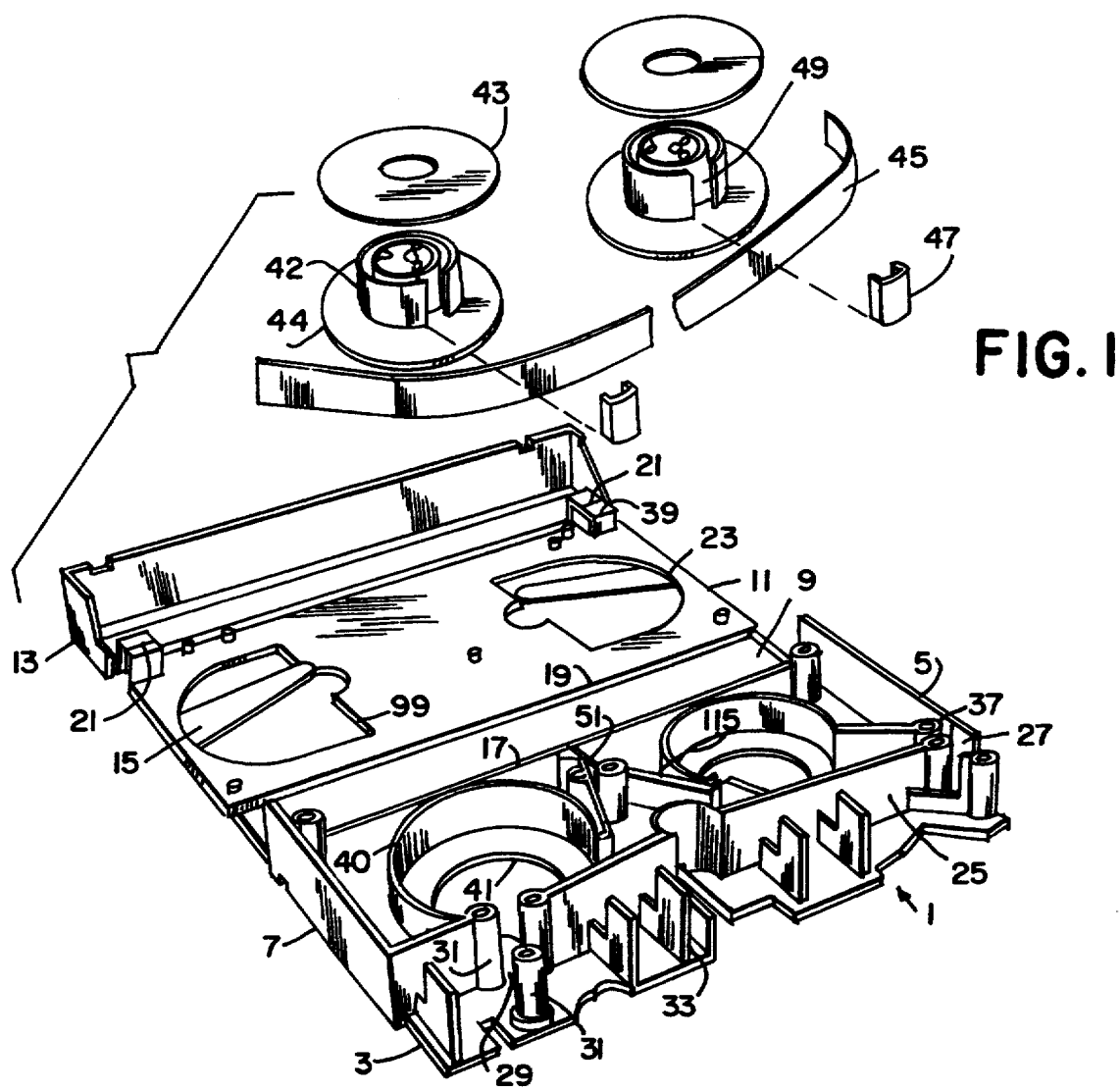
FIG. 1 is an elevational view of the preferred cassette housing with reels and a tape leader.

Referring to FIG. 1, a tape cartridge housing is generally indicated by the numeral 1. The housing has a base 3 first and second opposite side walls 5 and 7, a rear wall 9, cover 11, a dust door 13 and hub springs 15 which are all integrally molded. Living hinges 17, 19 and 21 respectively join the base, the rear wall, the cover, and the dust door. Living hinges 23 join the springs to the cover. The cover includes an integrally molded front wall 25 which has tape gaps 27 and 29 which are bordered by integrally molded smoothly rounded tape guiding posts 31. The center of the front wall has two integrally molded tape guides 33. Cylindrical female snaps 37 are integrally molded in the base, and complementary male snaps 39 are integrally molded in the cover.

The base incorporates two tape reel-receiving cylindrical walls 40 integrally molded with the base, spaced from hub openings 41 and protruding upwards towards the cover for nesting and holding hubs 42 which hold the tape or leader 45. The walls 40 are intended to surround relatively short lengths of recorded tapes, such as used for advertising. The cassette is supplied closed with a leader that may be cut and spliced or opened ready to drop in a reeled tape before closing. Removable discs 43 allow access to tape clip apertures 49. The tape leader is placed in front of the aperture and the tape clip is forced into the tape clip aperture 49. Hub clips 47 hold the tape in the slots. Flanges 44 on hubs 42 overlie openings 41 and have serrated edges which engage brake teeth.

An axis of rotation or the effective pivot of the living hinges 21 is stepped downward from the cover and is interrupted so that the hinges are not in the tape path.

Figure 2:
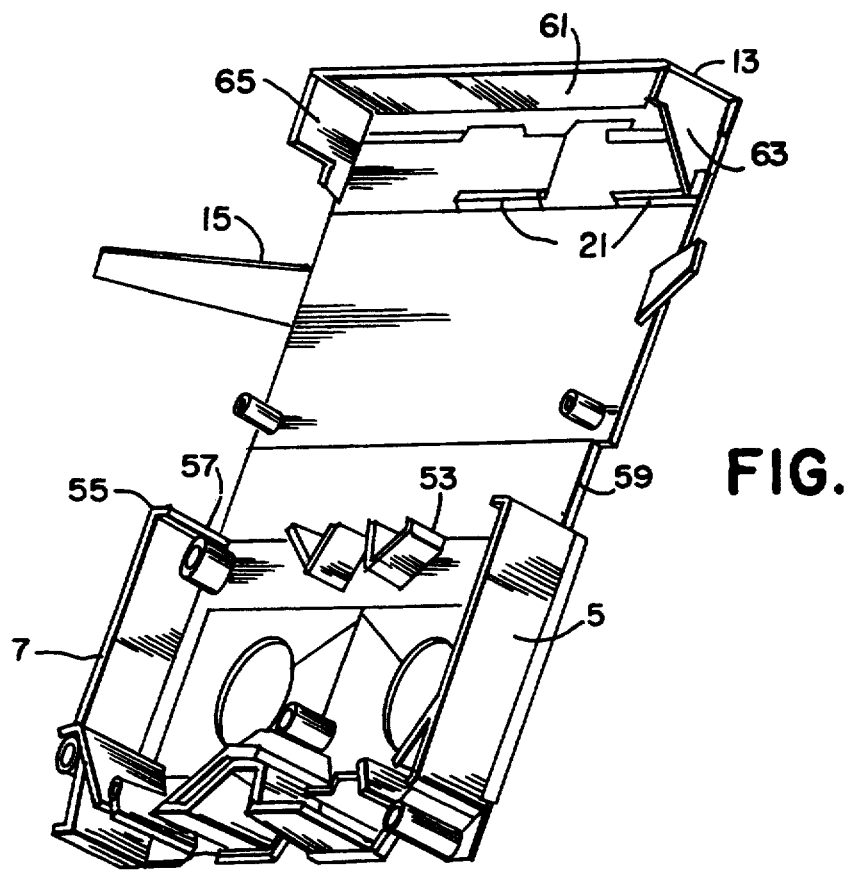
FIG. 2 is a schematic view of an alternate cassette housing of the present invention showing elements in their molded position.

The cassette further has an alternate drop-in single piece hub lock 51, which is guided by hub lock centering elements 53, as shown in FIG. 2.

Figure 3:
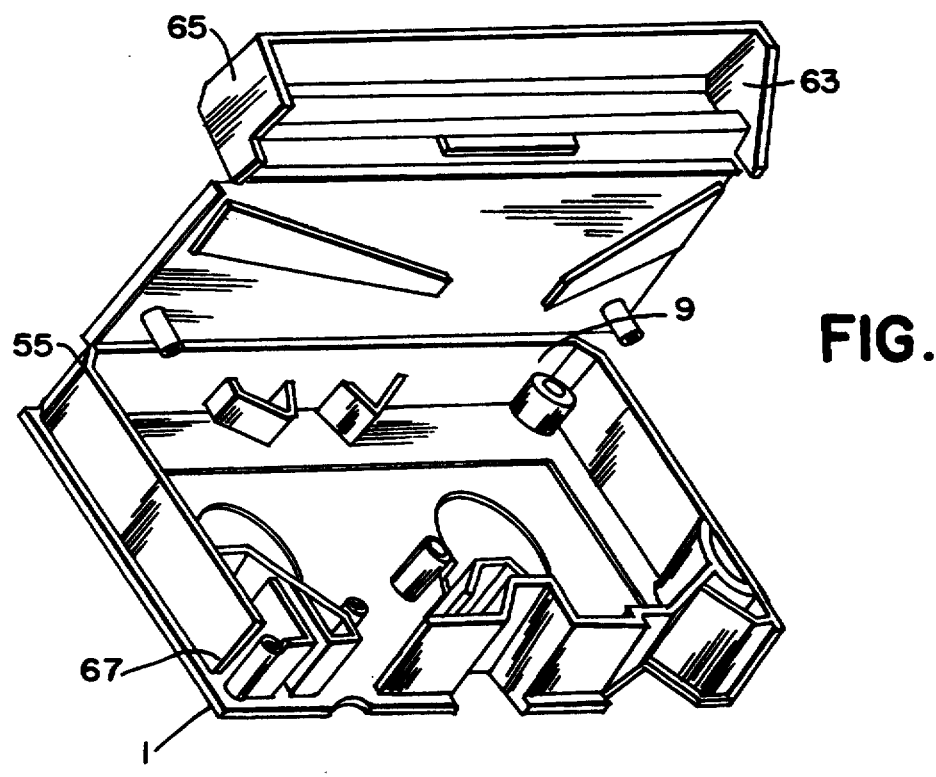
FIG. 3 is a perspective view of the FIG. 2 embodiment, showing the rear wall folded upward and showing the hub springs folded inward on the cover.

As shown in FIGS. 2 and 3, the side walls 5 and 7 have rounded rearward portions 55 with inner edges 57 which engage outer edges 59 of the rear wall. The hub lock centering elements 53 tend to rigidify the rear wall.

The dust door 13 is molded in its downward position, and is joined to the cover by integrally molded living hinge 21. The dust door 13 has a front wall 61 and first and second opposite side walls 63 and 65. Side wall 65 cooperates with an integrally molded dust door latch 67 as will be described in more detail with reference to FIG. 8.

As shown in FIG. 3, the rear wall 9 is folded upward. After dropping the leader-loaded or tape-loaded hubs into the housing, hub springs 15 are folded inwardly and dust door 13 moves upwardly to clear the upper edges of the front wall, as the cover 11 is folded over the base and side walls.

Figure 4:
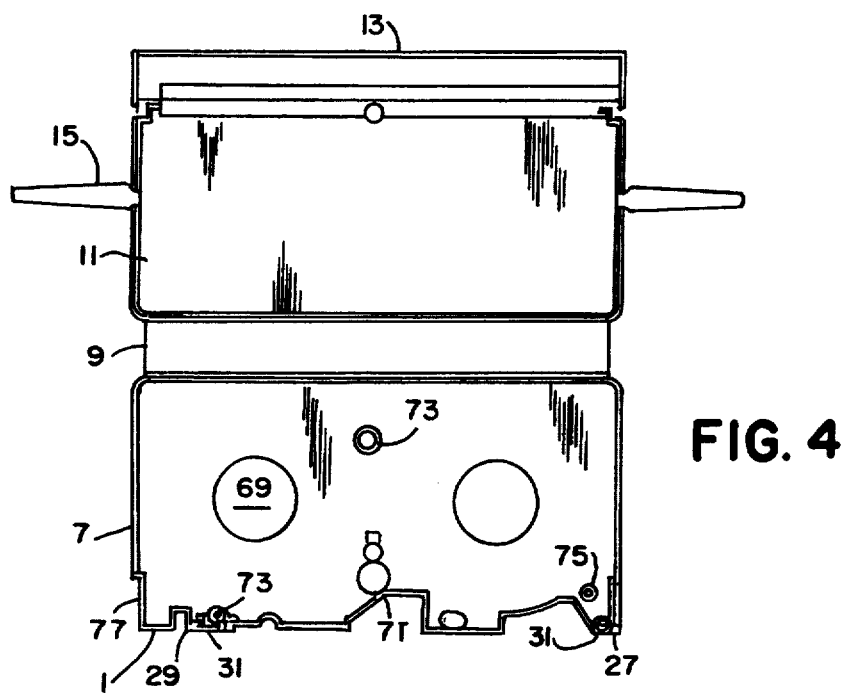
FIG. 4 is a plan view showing the molded position of the housing.

As shown in FIG. 4, the entire housing 1 may be molded with the rear wall 9, cover 11, springs 15 and the top of the dust door 13 in a planar condition. The base 3 has two major openings 69 which act as guides for the reel hubs. A cylindrical upward protrusion 71 is included for insertion of a conventional control. Opening 73 allows the insertion of a conventional brake release pin from the player equipment. Tape gaps 27 and 29 are uniformly formed in the front wall. Tape guiding posts 31 are integrally formed along edges of those openings, and tape directing posts 73 and 75 are formed inside those openings.

A dust door latch, shown in FIG. 8, is integrally formed and connected with a living hinge 68 at the top of side wall 7 in the forward recess 77.

Figure 5:
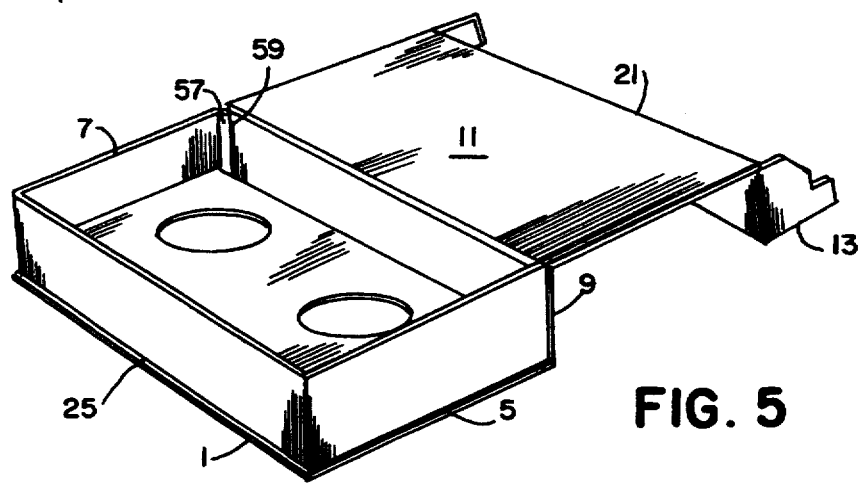
FIG. 5 is an elevation of the molded housing with the rear wall molded or folded upward.

FIG. 5 schematically describes the tape cassette 1 wherein the side portions 5 and 7 and rear wall 9 are vertically molded on the base. The integrally molded front wall 25 is schematically shown. The inner edges 57 of the side wall engage the outer edges 59 of the rear wall. The cover 11 is in the molded position, and the door 13 is connected to the cover via the living hinge schematically shown at 21.

Figure 6:
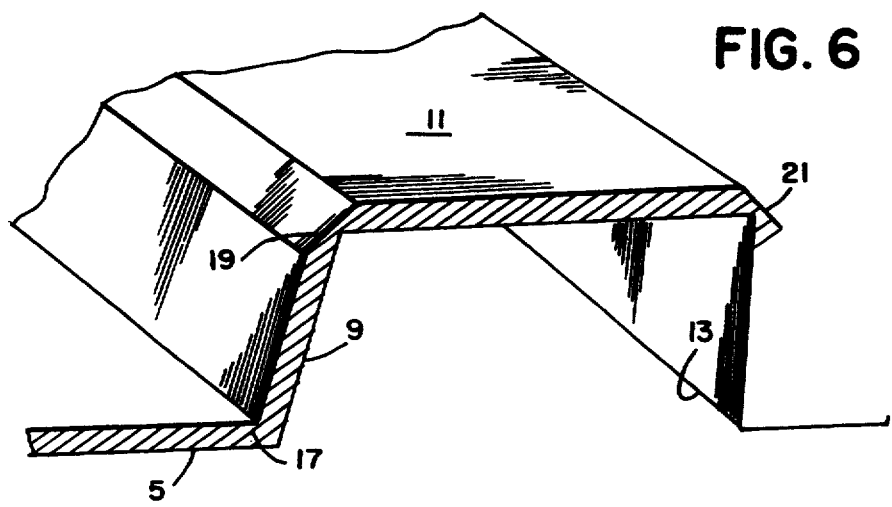
FIG. 6 is a detail showing simplified construction of the living hinges of the cover.

FIG. 6 schematically shows the living hinges 17, 19 and 21 respectively between the base 5, rear wall 9, cover 11, and door 13. As shown in FIG. 1, the cylindrical female snaps on the base and the complementary male snaps 39 on the cover mate and hold the cover fast upon upper edges of the sides of the cassette.

Figure 7:
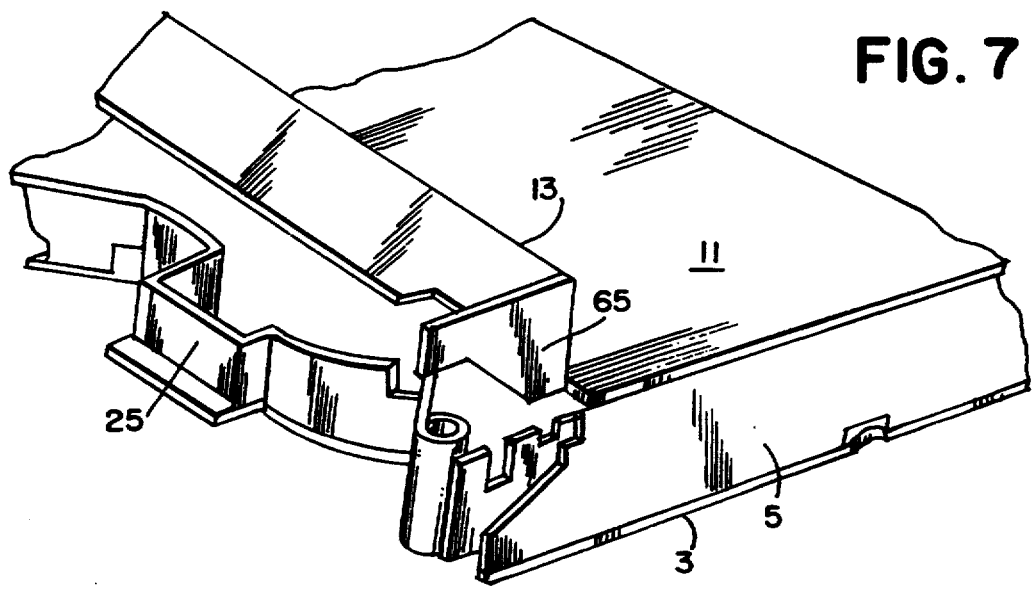
FIG. 7 is a detail of the dust cover of the invention.

FIG. 7 shows the closed cover 11 upon side 5, with the dust door 13 in the opened position to reveal the front wall 25. The dust door 13 has a living hinge and integrally molded side walls 65, one of which mates with a dust door latch to hold the dust door in the closed position when not in operation. The dust door side wall has an internal ridge or recess for receiving the dust door latch.

FIG. 8 shows the dust door latch 67 integrally molded at the top of recess 77 in the side wall 7 of the cassette. The latch resembles a flap on a living hinge 68 and has protrusions 79 and 81 which engage, respectively, a latch release and the inner edge of the side wall of the dust door. The latch folds downward into the recession. The living hinge provides the required outward urging of the latch to hold the dust door downward. An opposing spring 83 may be added. The latch flap 67 snaps behind an edge 85 in the recess and is pushed outward against the edge by the hinge and opposing spring to force protrusions 79 and 81 toward the plane of the side wall to thereby engage the conventional release and the inner edge of the side wall of the dust door. Insertion of the tape into the player causes a depression of the protrusion 79 and the latch flap within the recess, which causes the disengagement of the protrusion 81 from an opening or inner ridge of the door side, thus allowing the dust door to be raised during operation.

As schematically shown in the details of FIGS. 9-11, the front vertical wall 25 of the cassette incorporates openings 27 and 29, tape guiding posts 31 and integrally molded tape guides 33.

FIG. 12 shows the tape hub for winding the tape within the cassette. The hub has a lower flange 87, an upper disk or flange 43 and a winding drum 89 positioned therebetween. The winding drum incorporates a tape clip aperture 49 for receiving a tape. Clip 47 is complementary to the slot for holding the tape on the drum. The clip 47 may be hinged to the drum by living hinge 91, as shown in FIGS. 12 and 13. To load tapes into the cassette, the user places the leader in front of the tape clip aperture 49, swings up the clip, and pushes the clip and leader into slot 49. The tape end is inserted into the opening, and the clip is pushed upward into a closed position, wherein the edges 93 of the clip engage the sides 94 of the slot. Alternately, as shown in FIGS. 1 and 14, the upper disk or flange 43 of the hub is removable to expose a slidable clip 47 which slides out of the slot 49 normally obstructed by the removable disk 43. The edges 47 slide into grooves 97 in the slot 49 to engage the clip with the hub. The leader or tape 45 is placed between the clip and the hub and is thus, held for winding upon the drum.

Four fingers are formed by telescoping shut offs in the mold, which come up through the openings in bottom flange 44.

As shown in FIGS. 15-25, the leaf springs 15 are integrally molded with the cover 11 and are attached via living hinges 23. In the FIG. 1 embodiment, the hinges are molded so as to protrude inwardly and upwardly from the curved portion of a D-shaped cavity 99 in the cover of the cassette. Covering the cavity on the side opposite the hinged spring is a clear envelope for labels, which may be bonded to the cover, or a plastic see through window for viewing the tape. In the FIGS. 15-25 embodiments, the springs are molded so as to extend outwardly from the edge 12 of the cover, with the hinge 23 on the edge. To activate the springs, the springs are folded inwardly about the hinges toward the inner portion of the cover, with the hinge providing an opposing force to that action. A ramp, a snap, a spring engaging ramp, or snap 101, or both hold the compressed spring. A ramp 103 provides a fulcrum adjacent the engagement but more distal from the hinge than the engagement.

Figure 17:
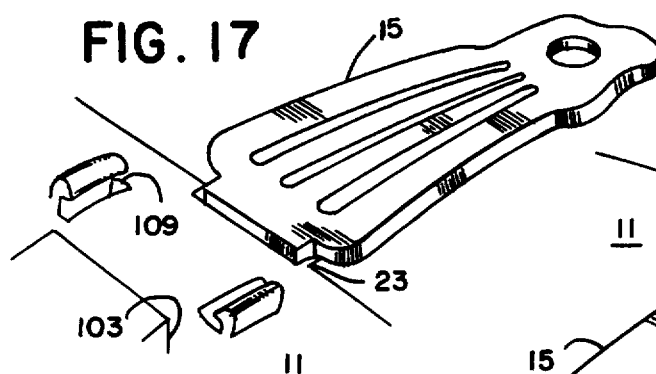
FIG. 17 is an elevational view of an alternate molded hub spring, snap and ramp.
Figure 18:
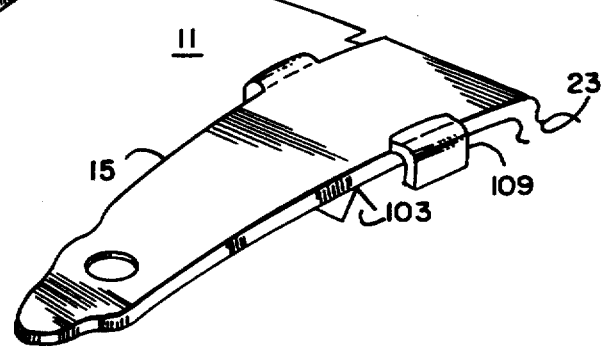
FIG. 18 is a view of the inward folded hub spring of FIG. 17.

The engagement 101 may take a variety of forms. In one embodiment, a wedge shaped protrusion 105 on the spring fits into a complementary slot 107 cut into the ramp, as shown in FIGS. 15 and 16. FIGS. 17 and 18 show an embodiment where the engaging means consist of a pair of hook-like clasps 109 protruding from the cover and engaging the sides of the leaf spring, while using the ramp 103 as a fulcrum for the spring. FIGS. 17 and 18 show the molded spring and the spring and action respectively.

Figure 19:
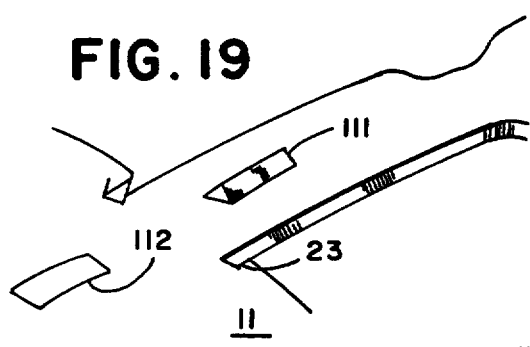
FIG. 19 shows an alternate view of the hub spring snap.

FIG. 19 discloses an alternate leaf spring 15 incorporating a protruding ramp snap 111 molded onto the leaf spring, which fits into recess 112 in the cover 11 and snaps therein. However, the mating of the ramp snap and recess is such that the former protrudes somewhat and acts as a ramp while still holding the leaf spring in a cantilever position upon the cover.

Figure 20:
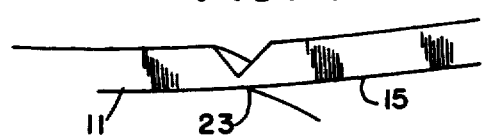
FIG. 20 shows the living hinge of the hub spring.
Figure 21:
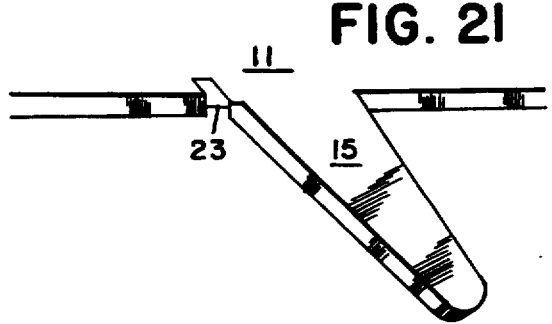
FIG. 21 and 22 show a molded hub spring in the originally molded position and folded inward.
Figure 22:
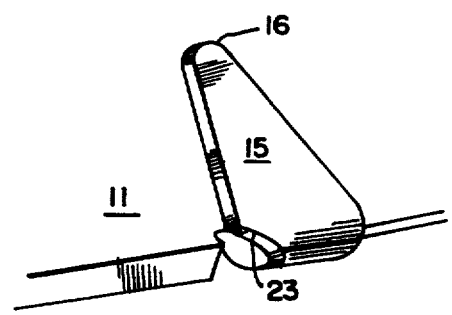

FIG. 20 shows a preferred living hinge 23 as disclosed between the leaf spring 15 and the cover 11. FIGS. 21 and 22 show the action of the molded leaf spring 15 as bending at the living hinge 23 in a cantilevered manner towards the inside of the cover 11 to thereby provide a hub spring at the distal end 16.

Figure 23:
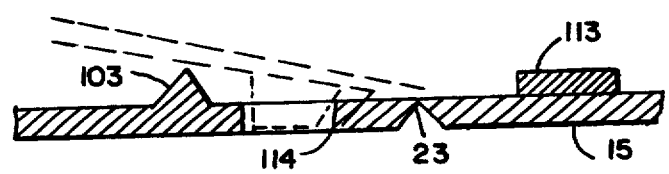
FIG. 23 is a sectional detail of the snap/ramp combination shown in FIG. 19.
Figure 32:
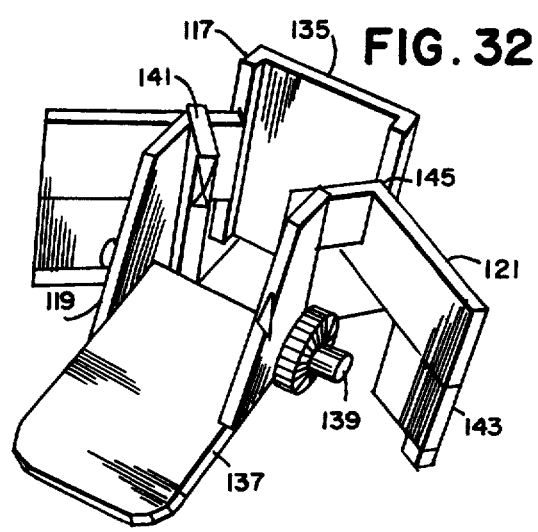
FIG. 32 is a front perspective view of an alternate embodiment of the hub lock.

FIGS. 23, 24 and 25 show one preferred embodiment of the leaf spring. Plural cylindrical protrusions 113 molded upon the leaf spring snap into complementary snap members 114 molded into the cover between the hinge 23 and the ramp 103. FIGS. 23 and 25 show cutaway versions of the molded and active positions of that embodiment.

The video cassette incorporates a hub lock or brake mechanism for preventing the rotation of the hubs during non use. Several embodiments of the present invention's hub lock are described in FIGS. 26-35. The constructions include an embodiment integrally molded with the cassette or, alternatively, an embodiment which can be separately molded and subsequently dropped into the cassette. One embodiment of the present hub lock 51 is shown in FIG. 26. The hub lock is situated within the housing whereby two hub locking arms 115 engage the serrated or toothed edges of the hub flanges when in the relaxed position. The brake 51 incorporates a brake release sleeve 117, which is halved and connected to two respective brake levers 119, which are subsequently connected to hub release arms 121, which oppositely extend from the respective levers. A fulcrum 123 is positioned substantially mid-way through the levers and is connected therebetween so as to provide a pivoting means between the halves of the brake release sleeve and the respective arms through each lever. Further, each lever incorporates a pivot sleeve 125 for allowing the levers to pivot when a force is applied to either the brake release sleeve or one of the hub release arms. The pivot sleeves rest upon pivot pins 127 which are molded into the base of the housing. A resilient spring 129 is positioned between the two levers closer to the arms than the fulcrum, so as to exert an outward force on the adjacent length of the lever, thereby causing the opposite ends of the lever to come together and substantially close the two halves of the brake release sleeve. In this position, the hub catch portion of the arms engage the hubs.

However, as shown in FIG. 27, when the cassette is in a player, a brake release pin enters the base of the cassette through the brake release orifice 73, as shown in FIG. 4. The brake release pin pushes apart the two halves of the sleeve and thereby causes an outward force upon the adjacent portions of the lever. The resultant opposite force is an inward movement of the opposite ends of the levers proximal the arms and the subsequent inward movement of the arms. That causes the disengagement of the hub latches 131 from the hub flanges.

Alternately, hub lock 117, as shown in FIGS. 32–35, incorporates a brake support 135, a brake shelf 137, and a brake axle. Two brake levers 119 connected to the brake shelf and abut two respective brake arms 121. In that embodiment of the hub lock mechanism, a brake support 135 holds the hub lock between the hubs. The resting position results in the engagement of the brake arms 121 with the respective hub flanges. In that position, the brake shelf 137 lies over the hub release orifice. When the cassette is inserted into a machine, a hub release pin forces the bottom of the shelf in an upward movement and in a rotation about the brake axle 139 at the opposite end of the shelf. Attached adjacently thereto on each side of the brake shelf are the brake levers 119 which protrude substantially perpendicularly from the shelf. Abutting these levers are drive plates 141 connected to the brake arms. The rotation of the brake shelf causes a similar rotation of the brake levers, which subsequently actuates identical inward movements of the drive plates, pulling the brake arms inward. The inward movement of the drive plates causes the rotation of the brake arms due to the sliding connection therebetween. The brake arms swing inward towards the shelf and hub engaging edges 143 disengage the hub flanges.

The upward force of the release pin upon the brake shelf is opposed by living hinges 145 between the brake arm and the brake support. The normal position of the brake arms is substantially planar to the brake support. The positioning of the perpendicularly connected drive brakes within the edges of the brake levers results in downward pressure upon the brake shelf.

Figure 34:
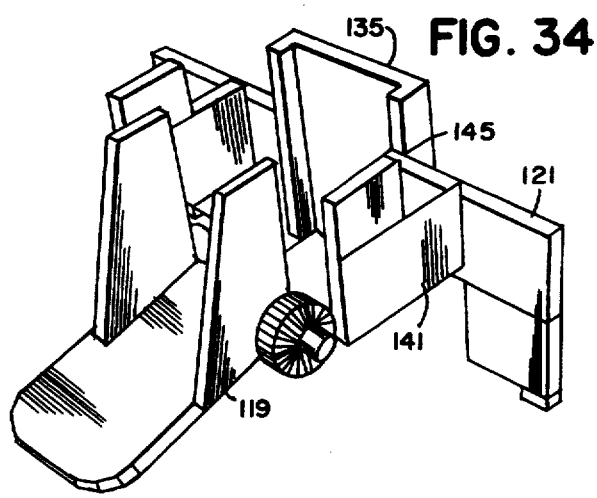
FIG. 34 is a perspective view of the molded position of the hub lock shown in FIGS. 32 and 33.
Figure 33:
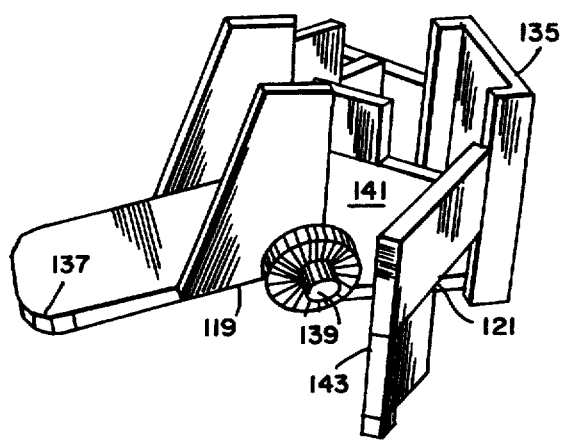
FIG. 33 is a side perspective view of the hub lock shown in FIG. 32.
Figure 35:
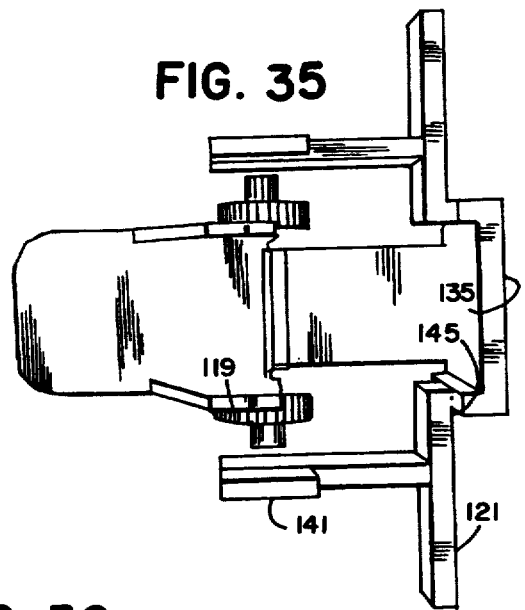
FIG. 35 is a top view of the alternate molded position of the hub lock shown in FIG. 34.

FIGS. 34 and 35 show the hub brake as molded, before the drive plates 141 are placed within the brake levers 119. The living hinge 145 between the brake arm 121 and the brake support 135 is in the closed position.

While two preferred embodiments of the brake have been described, any braking mechanism could be substituted without taking away from the overall invention of the one piece integrally molded recyclable cassette.

The embodiments for the window openings in the cover range from small to .large. However, the preferred embodiment includes a real leaf spring or hub spring internal to the opening. The window can be opaque with no visibility, or clear with a see-through label, see-through plastic film label trap, or see-through spaghetti box window in paper/paper board label. An alternate cover attachment is a label which attaches to the cover for tape identification. The label can be of paper or paper board, plastic or plastic film, a combination thereof (a la spaghetti box window), or paper/paper board inserted under plastic film label trap. The label can be adhered to the cover by snaps, pressure-sensitive over-label, direct thermal welds, or molded-in insert card.

Figure 36:
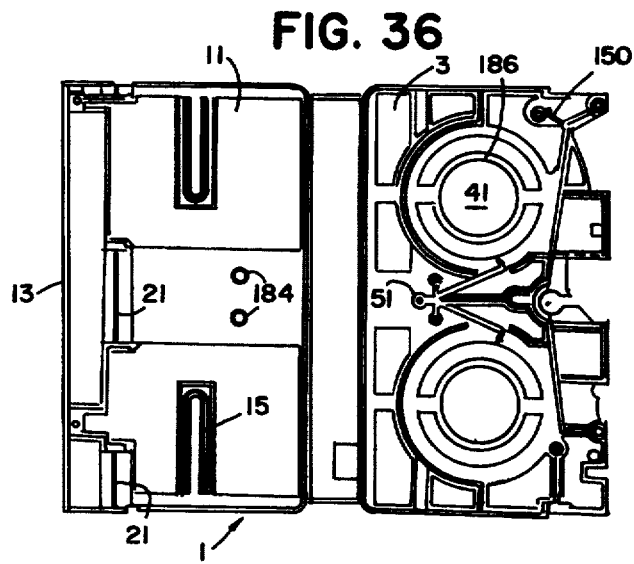
FIG. 36 is a top view of the unitized shell or housing with integral mechanics.
Figure 37:
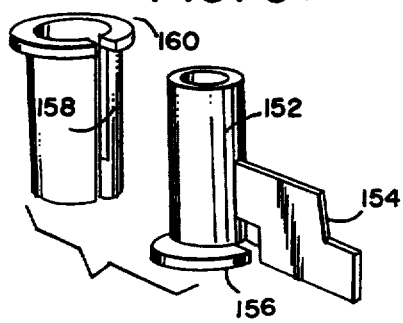
FIG. 37 is a perspective side view of the integral guide post with slit metallized guide sleeve, with an alternative snap-on feature.
Figure 38:
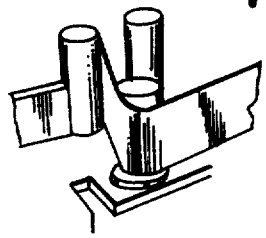
FIG. 38 is a perspective top view of the guide post in action.
Figure 39:
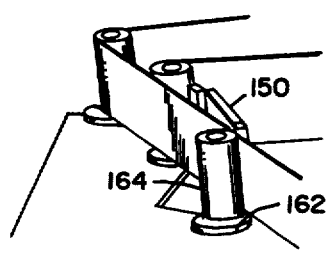
FIG. 39 is an elevated side view of the guide roller and opposite pressure flap in action.

Other features include an integrally molded pressure flap 150 as shown in FIGS. 36 and 39, which controls tension on the tape at the front of the apparatus. A penetrating shut off comes through the opening and forms the bottom of the pressure flap. The pressure flap works in conjunction with a guide pin or pin and roller. The pin may be a rolling element. Debris embeds in plastic, scratching tape. Both pins can be integrally molded with the apparatus to provide their function. The guide post can be made of one piece with the integrally molded plastic cassette. Component guide rollers may be made of metal guide pins or plastic pins over which other rollers can slide. These guide pins or posts substantially control the flow of the tape from the interior to the exterior, and vice versa, and are thereby fitted to the proximal width of the tape to substantially control any wavering or lateral movement caused in the process of running the tape. This can be accomplished by including upper and lower flanges which nearly abut the edges of the tape. FIGS. 37, 38 and 39 substantially show the pressure flap and flanged tape guide in action. FIG. 37 shows guide pins comprised of an integral guide pin 152, incorporating a molded support rib 154 and lower flange 156. A guide pin sleeve 158 slides over the integral guide pin and snaps into place with snaps 159, which engage surface 155. The guide post sleeve has an upper flange 160 and can be constructed of plastic with an optional stainless steel metallized surface. The preferred construction is a cylindrically polished plastic pin with an optional stainless steel metallized surface. A cylindrical polish in the particular location in the mold replaces the standard draw polish. FIG. 38 shows the integral guide post and sleeve in place with a tape constrained by the upper and lower flanges. FIG. 39 shows a guide pin/pressure flap construction, wherein an integral guide pin 162 incorporates a guide roller 164, which abuts the tape. Opposite the guide roller lies the pressure flap 50, previously shown in FIG. 36.

FIG. 36 is a top view of the integrally molded tape cassette showing the unitized shell or housing 1, having a cover 11, base 3 and dust door 13. The entire assembly folds up to enclose removable tape hubs. In the embodiment as shown in FIG. 36, the hub or wheel lock 51 is of a one-piece construction that is integrally molded with the base of the cassette. The separate elements (i.e. base, rear wall, cover and dust door) are all attached, incorporating living hinges. In one embodiment, the vitality of these hinges can be assisted by incorporating snap-in wires or springs, which are easily removable and can be recyclable.

Figure 40:
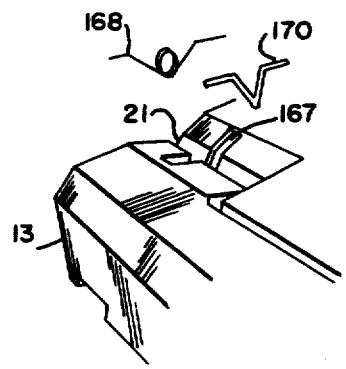
FIG. 40 is an elevated view of the dust door and living hinge incorporating supplemental springs.

FIG. 40 shows the living hinged dust door 13 with living hinge 21. In this embodiment, a spring slot 167 can hold either of two springs 168 and 170 to assist the living hinge to give the dust door the force to close when out of a video player.

Figure 41:
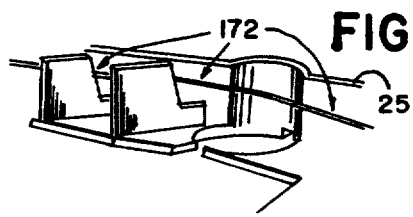
FIG. 41 is a side view of the repositioned front wall for the exterior light path.

FIG. 41 is an alternate configuration for the front wall of the low cost video cassette, wherein the front wall 25 is repositioned rearwardly to allow an external light source path 172 for detecting the clear leader of the video cassette tape.

Figure 42:
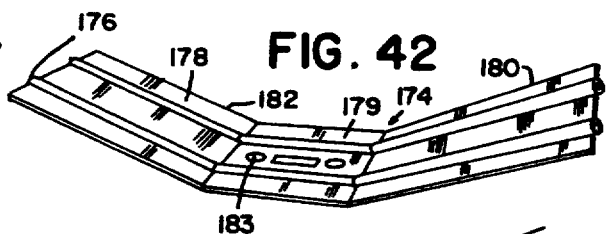
FIG. 42 shows an alternate composite leaf spring.

FIG. 42 shows a composite tape hub spring 174, which is constructed with reinforcement wires 176 and plastic 178. It may be constructed in injection molding or wire plastic extruding processes. The wire and plastic extrusion process is continuous, wherein the composite extrusion is cut to length, stamped and formed to provide the structure as shown in FIG. 42. The extruded spring has two opposite arms 180 and 182, which extend from a base portion 179. The base portion has plural holes 183, which mate with protrusions 184 on the cover of the video cassette, as shown in FIG. 36. Thus, the base portion locks into place on the cover, wherein the arms extend outwardly and downward from the cover towards the center portions of the hubs.

FIG. 36 further shows rings 186 around the hub holes or openings 41 for allowing thinning of the wall in the base without loss of hub reference height. This restricts the movement of the hub within the cassette and lessens damage that additional hub movement can cause to the tape on the hub.

Figure 43:
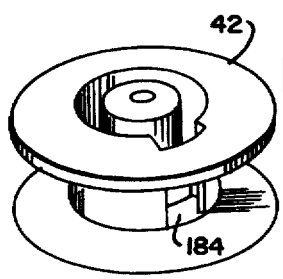
FIG. 43 is an elevated side view of a preferred one-piece tape reel, showing a tape clip aperture.
Figure 44:
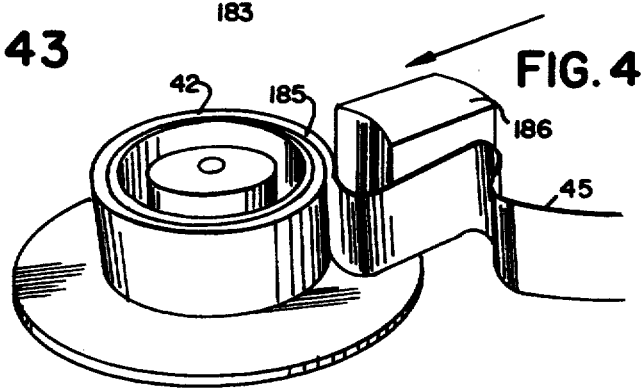
FIG. 44 is an elevated side view of the adherence leadering method of one embodiment of the present invention.

Another option is provided for the hub mechanism, wherein the hub is made of one piece, such as shown in FIG. 43, and the attachment of the tape leader is a simple process. The one-piece hub can provide clip-less leadering, such as shown in FIG. 44, wherein the leader welds or adheres to itself or to the hub. Further, a vacuum port or slit can be provided in the hub for self-threading of the leader before welding/adhering of the leader to the hub. These methods are options to the clip functions previously described.

FIGS. 43 shows an alternate hub for clip leadering. FIG. 43 shows the hub 42 incorporating a tape clip aperture 184 for fixing the leader. FIG. 44 shows an alternate hub 42, wherein a tape or leader 45 winds around the hub and adheres to the hub or to itself at the 360° interval 185 through a conventional adhesive or adhesive reactive to an adhering element 186 which can apply heat, voltage, light or other reactive means.

Regular leader tape is wrapped and welded to itself or to the hub. Leader tape is coated with thermal adhesive softening at about 300°-350° F. The tape leader is run across the surface, and the surface of the hub and the leader are heated to the softening point of the adhesive.

While supplementary springs can be utilized in the hinge of the living hinge door, it is also feasible for supplementary springs or supports to be utilized in other elements of the unitized shell video cassette.

Figure 45:
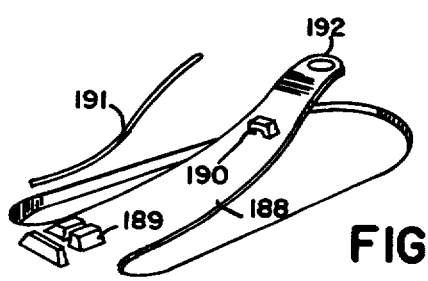
FIG. 45 is an elevated view of a leaf spring incorporating a supplementary support spring.

FIG. 45 shows an alternate leaf spring 188, which incorporates clamping means 189 and holding means 190 for engaging and holding a supplementary rod/spring 191, which assists the integrally molded leaf spring in its action against the hub at its distal end 192.

Figure 46:
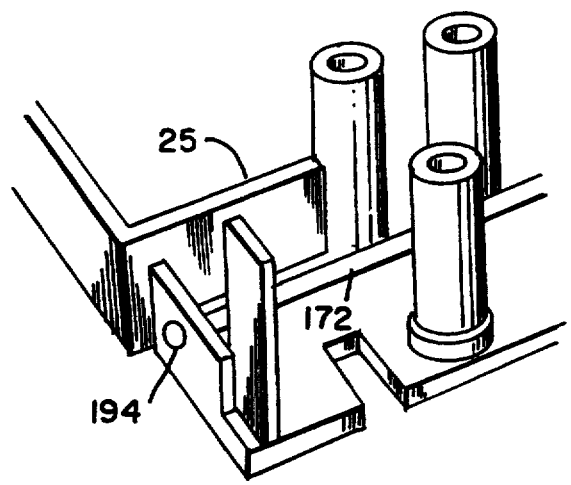
FIG. 46 is an elevated view of the recessed front wall and corner portion.

FIG. 46 schematically shows an embodiment of the unitized shell.

Figure 47:
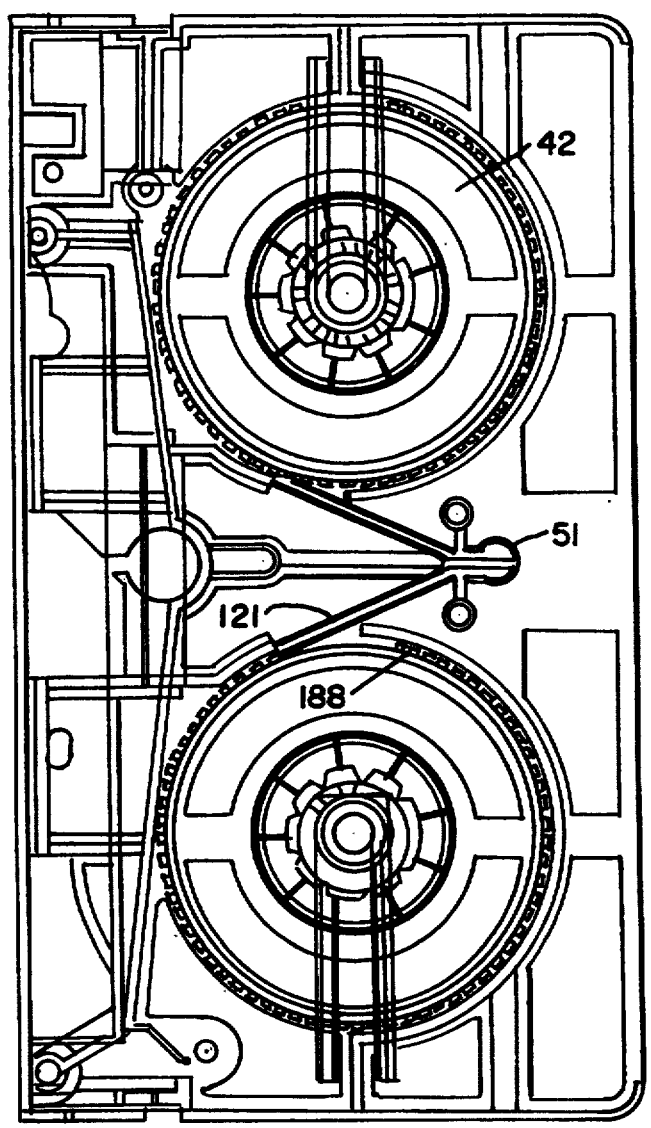
FIG. 47 is a cutaway top view of the unitized shell showing detail of the hub lock and hub engagement.

FIG. 47 is a cutaway view of the unitized shell or housing with the tape hubs 42 in place. The cutaway figure shows the engagement of the hub lock 51, having hub release arms 121 which engage gear-like indentations 188 on the reel.

FIG. 48 shows a side elevational view of an embodiment of the unitized shell which incorporates a means for providing a window 190 on the cover of the unitized shell. The window is provided by an indented portion 192 for receiving a paper/paper board card. The indentation has four edge slots 193 for engaging the corners of the card and holding it therein. Further, a clear or semi-clear film 196 covers the aforementioned label trap and adheres or snaps to the cover along ledge portions 197 around the trap, or indentation 192.

In one embodiment, a clear, semi-clear or printed film is adhered to the top surface. An embodiment may weld or adhere a label trap to the top, leaving one or two edges open to slip a card under the trap.

FIG. 49 shows the preferred unitary hub lock 51, previously shown in FIGS. 26–31. As shown in the present figure, the hub lock is engaging the hub at hub release arms 121. However, the engagement of the tape in the tape recorder causes a brake release pin incorporated in the video cassette recorder to be forced upwardly into the pivot sleeve 125 to thereby cause the action as shown by the series of blackened arrows. In other words, the halves of the brake sleeve are forced apart, which thereby causes the inward movement of the brake release arms and the subsequent release of the brake from the hubs.

Surface 51 in the area of tip 121 and the bottom surface of 121 are formed by penetrating shut offs. The split hub lock is designed so that each hub lock can operate independently. Independent action is important to ensure locking during shipment. Typical engaging teeth are to the rear of the release pin. Here engaging teeth are to the front of the release pin FIGS. 50 and 51 show opposite elevated side views of two alternate methods of forming the dust door latch 167 from that as shown in FIG. 8. The figures show the latch in the molded and ready positions respectively.

FIGS. 52 and 53 show preferred molds 180 with side actions 182 for forming a hub 184.

FIG. 54 shows a preferred hub 184.

FIGS. 55 and 56 are top and side views of a preferred brake 186 showing pivots 188, release pin receiver 190, and engaging teeth 192.

FIG. 56 shows the hole 194 in base 3 through which the brake is formed.

FIG. 57 shows preferred dust door hinges 21.

The preferred material for the shell and dust door is polypropylene. High density polyethylene is suitable. Impact styrene may be used. The polypropylene homopolymer gives the best living hinge life, and the co-polymer gives better impact resistance. Polypropylene tailored by blending the homopolymer and co-polymer to achieve the best combination of hinge life is preferred. Polypropylene is also the least expensive polymer by virtue of its low cost and low specific gravity.

High density polyethylene is also a potential material. It has less of a hinge life but could be adequate. High density polyethylene has good cold temperature impact strength. The polymer is more expensive than polypropylene, although recycled high density polyethylene is in wide abundance and is inexpensive. Recycled high density polyethylene and recycled polypropylene may give good cost/performance value.

Polystyrene, particularly modified polymers, could be used, but hinge life would be limited.

While the invention has been described with reference to specific embodiments, modifications and variations may be constructed without departing from the scope of the invention, which is defined in the following claims.

We claim:

1. A video cassette shell having a base, a cover, front, side and walls between the base and cover, tape guiding openings in the front wall and a dust cover pivoted of the shell of overlying tape extended through openings on the front wall, the shell being constructed of polypropylene material, having a living hinge formed between the base and the rear wall.

2. A video cassette shell having a base, a cover, front, side and rear walls between the base and cover, tape guiding openings in the front wall and a dust cover pivoted on the shell for overlying tape extended through openings on the front wall, the shell being constructed of polypropylene material, having a living hinge formed between the base and the rear wall and the cover and the rear wall.

3. A video cassette shell having a base, a cover, front, side and rear walls between the base and cover, tape guiding openings in the front wall and a dust cover pivoted on the shell for overlying tape extended through openings on the front wall, the shell being constructed of polypropylene material, further comprising leaf springs integrally attached to the cover and tape guiding surfaces integrally connected to the base, the springs and surfaces being constructed of the same polypropylene material.

4. A video tape cassette housing, comprising a cover, a base, a rear wall, first and second opposite side walls connected to the base and cover, a dust door pivoted on a front of the housing for permitting movement of the dust door between a raised position and a lowered position covering a front of the cassette housing, the cover, base, walls and dust door being made of polypropylene, having a living hinge formed between the base and the rear wall.

5. A video tape cassette housing, comprising a cover, a base, a rear wall, first and second opposite side walls connected to the base and cover, a dust door pivoted on a front of the housing for permitting movement of the dust door between a raised position and a lowered position covering a front of the cassette housing, the cover, base, walls and dust door being made of polypropylene, having a living hinge formed between the base and the rear wall and the cover and the rear wall.

6. A video tape cassette housing, comprising a cover, a base, a rear wall, first and second opposite side walls connected to the base and cover, a dust door pivoted on a front of the housing for permitting movement of the dust door between a raised position and a lowered position covering a front of the cassette housing, the cover, base, walls and dust door being made of polypropylene, further comprising leaf springs integrally attached to the cover and tape guiding surfaces integrally connected to the base, the springs and surfaces being constructed of the same polypropylene material.

7. A video tape cassette housing, comprising a cover, a base, a rear wall connected to the base and the cover, first and second opposite side walls connected to the base and the cover, a front wall connected to the base and the cover, a dust door pivoted near a front of the housing for permitting movement of the dust door between a raised position and a lowered position covering a front of the cassette housing, the cover, base, walls and dust door being made of polypropylene, having a living hinge formed between the base and the rear wall.

8. A video tape cassette housing, comprising a cover, a base, a rear wall connected to the base and the cover, first and second opposite side walls connected to the base and the cover, a front wall connected to the base and the cover, a dust door pivoted near a front of the housing for permitting movement of the dust door between a raised position and a lowered position covering front of the cassette housing, the cover, base, walls and dust door being made of polypropylene, having a living hinge formed between the base and the rear wall and the cover and the rear wall.

9. A video tape cassette housing, comprising a cover, a base, a rear wall connected to the base and the cover, first and second opposite side walls connected to the base and the cover, a front wall connected to the base and the cover, a dust door pivoted near a front of the housing for permitting movement of the dust door between a raised position and a lowered position covering a front of the cassette housing, the cover, base, walls and dust door being made of polypropylene, further comprising leaf springs integrally attached to the cover and tape guiding surfaces integrally connected to the base, the springs and surfaces being constructed of the same polypropylene material.

10. A video cassette shell having elements comprising a base, a cover, front, side and rear walls between the base and cover, tape guiding openings in the front wall and a dust cover pivoted on the shell for overlying tape extended through openings on the front wall, wherein the shell and its elements and tape yielding surfaces are molded of a plastic material selected from the group of plastic materials consisting of: polypropylene and a blend of polypropylene and polyethylene.

* * * * *

UNITED STATES PATENT AND TRADEMARK OFFICE
CERTIFICATE OF CORRECTION

PATENT NO. : 5,417,379

DATED : May 23, 1995

INVENTOR(S) : Paul J. Gelardi, John A. Gelardi and David A. Capotosto

It is certified that error appears in the above-identified patent and that said Letters Patent is hereby corrected as shown below:

Column 14,
Claim 10, line 6, change "yielding" to --guiding--.

Signed and Sealed this

First Day of August, 1995

*Attest:*

BRUCE LEHMAN

*Attesting Officer*    Commissioner of Patents and Trademarks